United States Patent
Norden

(12) 
(10) Patent No.: US 6,352,245 B1
(45) Date of Patent: Mar. 5, 2002

(54) INTEGRATED FRONT LOWER SHOCK MOUNT, AXLE SPACER AND CASTER WEDGE

(75) Inventor: Wade A. Norden, Fort Wayne, IN (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/552,192

(22) Filed: Apr. 19, 2000

(51) Int. Cl.[7] ............................................. B60G 11/02
(52) U.S. Cl. ........................................ 267/36.1; 267/52
(58) Field of Search ..................... 280/124.17, 124.175, 280/124.1, 124.131, 124.171, 124.172, 124.173, 124.174; 267/36.1, 52, 53, 229, 247, 47, 37.1, 38, 39, 40, 41, 42, 43, 44, 45, 46, 260

(56) References Cited

U.S. PATENT DOCUMENTS

| 1,894,495 A | * | 1/1933 | Phelps | 267/52 |
| 2,791,419 A | * | 5/1957 | Whalen | 267/45 |
| 2,861,798 A | * | 11/1958 | Lenet et al. | 267/45 |
| 4,345,749 A | * | 8/1982 | Hellwig | 267/51 |
| 6,082,750 A | * | 7/2000 | Merkler et al. | 267/47 |

* cited by examiner

Primary Examiner—Robert J Oberleitner
Assistant Examiner—Thomas J. Williams
(74) Attorney, Agent, or Firm—Dennis Kelly Sullivan; Jeffrey P. Calfa; Gilberto Hernandez

(57) ABSTRACT

The invention provides a single member insert positionable between a front axle and each front leaf spring as a spacer. The member allows attachment of one end of a shock absorber for bracing against the axle. The member also serves as a caster wedge for maintaining proper steering response.

19 Claims, 7 Drawing Sheets

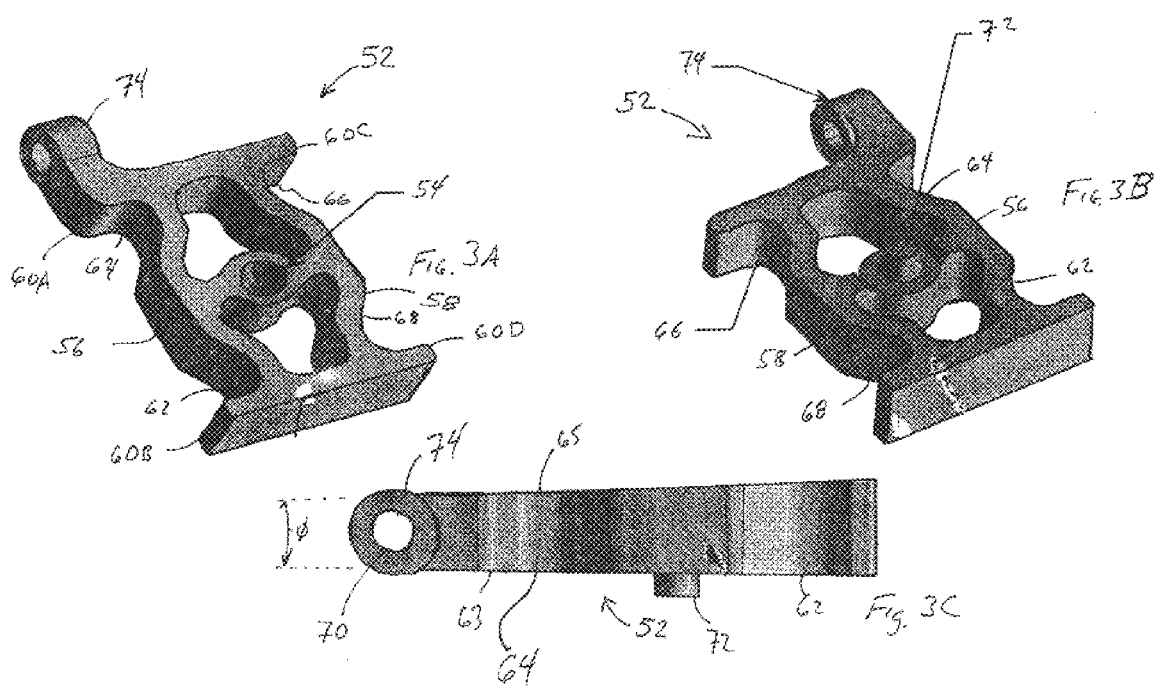

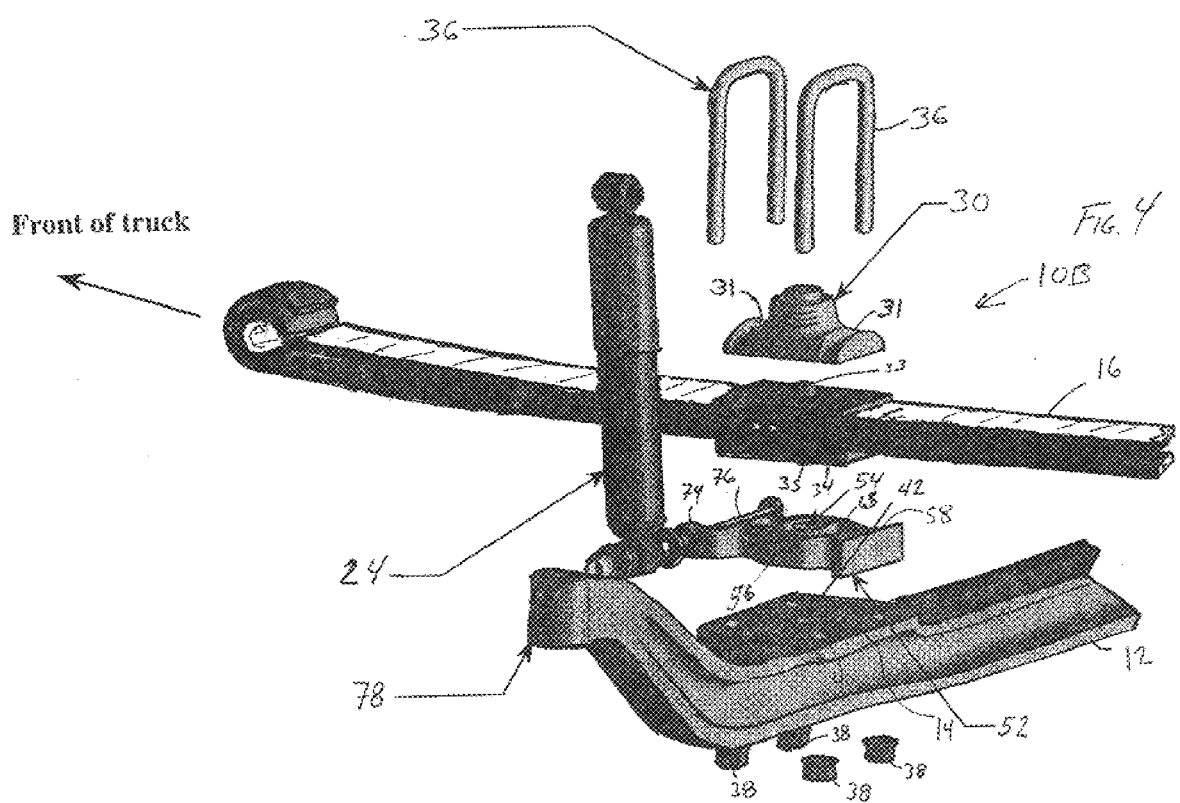

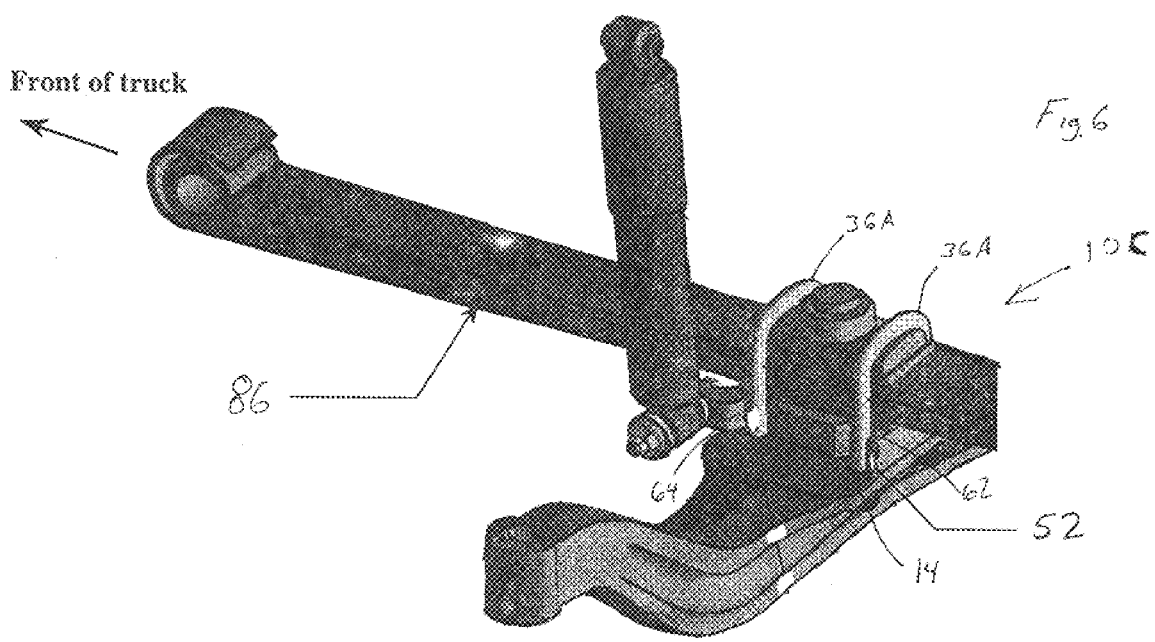

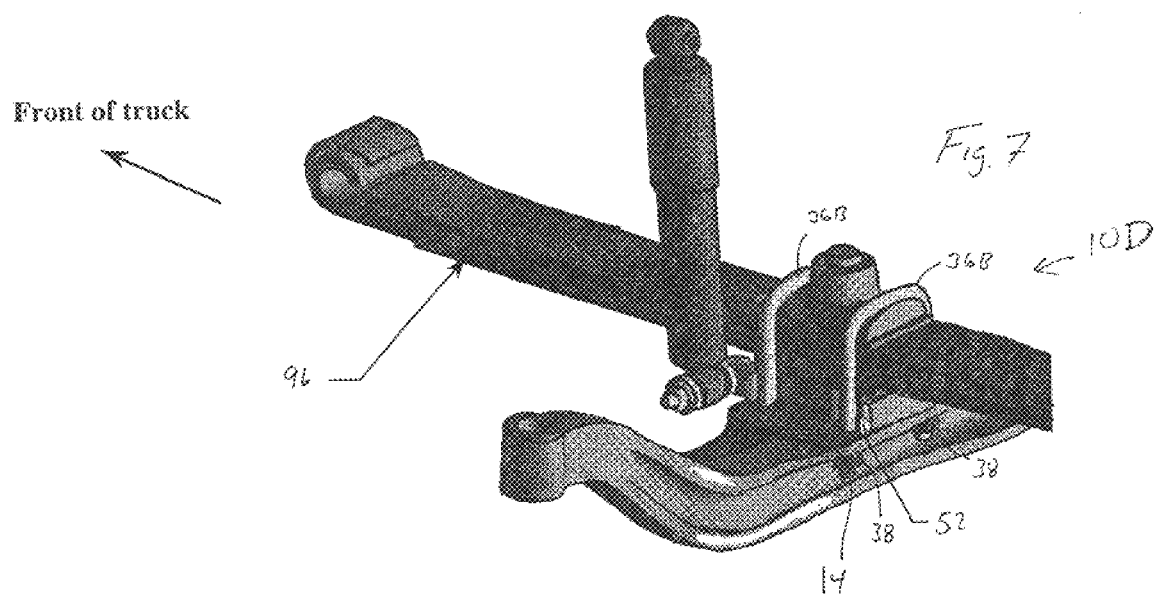

INTEGRATED FRONT LOWER SHOCK MOUNT, AXLE SPACER AND CASTER WEDGE

BACKGROUND OF THE INVENTION

1. Field of the Invention:

The present invention relates vehicle suspension systems and more particularly to the assembly of the suspension for a steering axle installed at the front end of a vehicle such as a truck.

2. Description of the Prior Art:

A common type of front end suspension for a truck steering axle relies on leaf springs positioned adjacent to and above opposed ends of the steering axle to locally support the weight of the truck from the axle. The leaf springs are elongated, flexible bars mounted perpendicular to the axle and parallel to the to major frame side rails of the vehicle chassis. Each leaf spring is rigidly attached at approximately its center point to the steering axle. Opposite ends of each leaf spring are coupled to a frame side rail fore and aft of the axle, helping to align and locate the axle. Shock absorbers are attached between the frame side rails and each end of the axle to dampen motion.

The assembly of front end suspensions requires the inclusion of components which: allow for the attachment of the shock absorber between the vehicle chassis and the axle; establish the proper spacing between the leaf spring and the axle to place the vehicle at its proper height; and, insure the proper alignment of the suspension and steering components. A factor complicating front end suspension assembly is that leaf springs of different sizes are used depending upon the anticipated use of the truck. Typically, leaf springs having a width of 3" (7.6 cm) are used for medium duty applications while leaf springs having a width of 4" (10.2 cm) are used for heavy duty applications. The differences in spring widths have prevented the use of a single element spacer in front end suspensions which meets the need to position the vehicle, insure proper alignment of the components for steering and provide a connection point for a shock absorber. While single piece devices exist which provide for one spring width, none is known to the inventors which works with springs of different widths.

A single piece device providing spacing, alignment and shock absorber installation to both common leaf spring widths would simplify manufacture. Such an element should also be easy to install correctly during vehicle assembly. What is needed is a unitary spacer, connector and alignment element which simplifies manufacture and reduces the number of parts to be kept in inventory.

SUMMARY OF THE INVENTION

The invention provides a vehicle suspension subassembly for a steering axle having a reduced number of parts and exhibiting interchangeability among leaf springs of differing sizes. The leaf springs at each end of a steering axle have mounting pads. The steering axle has horizontally disposed mounting pads adjacent to each end for cooperation with the leaf spring mounting pads. A spacing element disposed between mounting pad and the leaf spring has top and bottom major surfaces for mating with the leaf spring mounting pad and the steering axle mounting pad. The outside vertical sides of the spacing element are shaped to fit snugly against U-bolts of differing sizes used with leaf springs of different widths. The top and bottom major surfaces of the spacing element are canted with respect to one another to set steering axle caster. A shock absorber mount extends from the spacing element.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–B are perspective views of an integrated front lower shock mount, axle spacer and caster wedge in accordance with a preferred embodiment of the invention;

FIG. 4 is an exploded view of a suspension assembly incorporating a spacing element in accordance with one embodiment of the invention;

FIG. 6 is a perspective view of a suspension subassembly incorporating a spacing element in accordance with the preferred embodiment; and FIG. 7 is a perspective view of an alternative suspension subassembly incorporating the spacing element in accordance with the preferred embodiment.

DETAILED DESCRIPTION OF THE INVENTION

Figure 1:
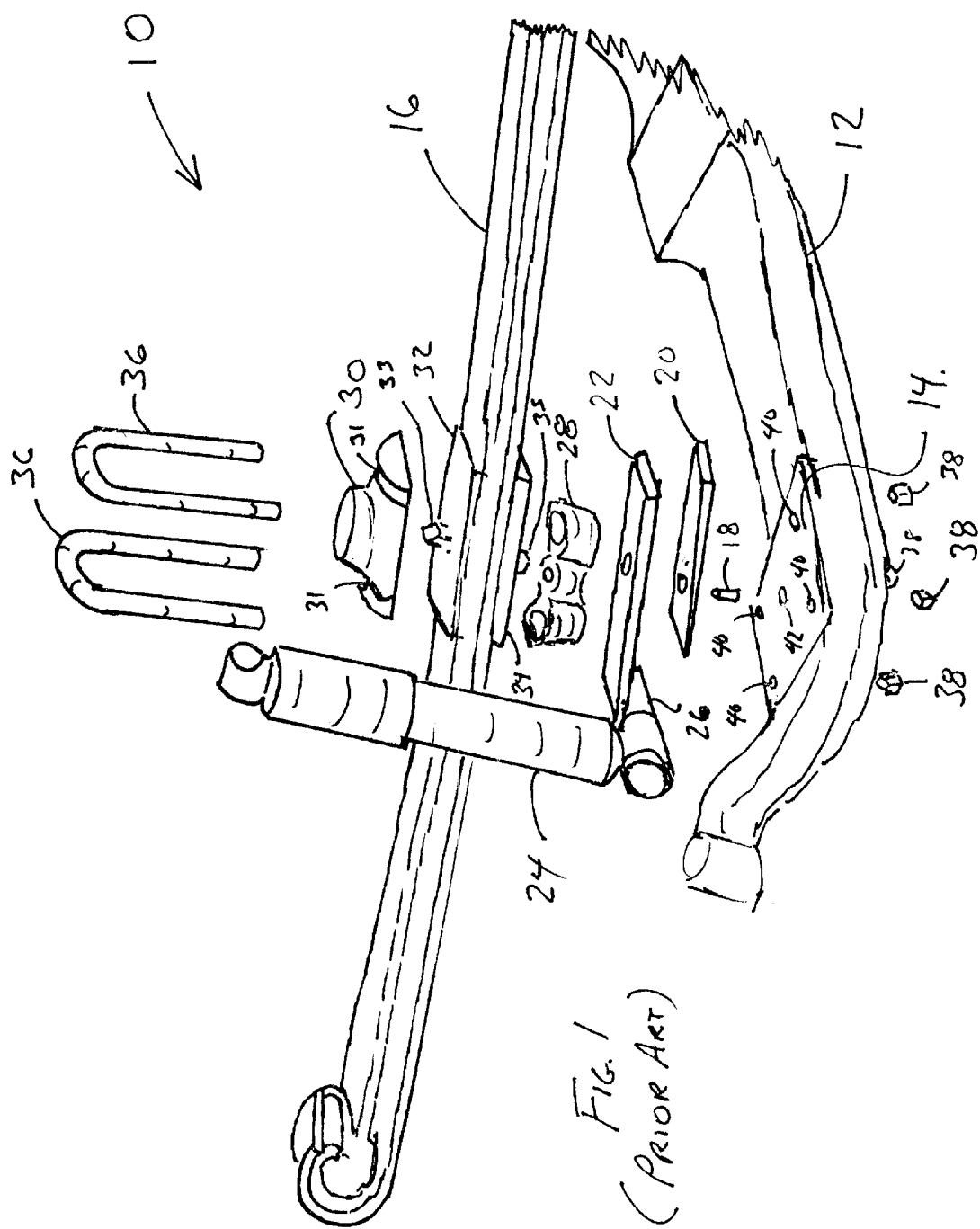
FIG. 1 is an exploded view of a prior art suspension subassembly.

FIG. 1 illustrates in an exploded view the components in a typical prior art front end suspension mounting subassembly 10 for a truck. Subassembly 10 has the function of rigidly attaching a leaf spring 16 to a steering axle 12. As is well known to those skilled in the art, leaf spring 16, which is coupled at its opposing ends to a vehicle frame (not shown), functions to locate and orient steering axle 12. Subassembly 10 includes separate components directed to each of three subsidiary functions: (1) providing a link point for one end of a shock absorber 24; (2) adjusting steering axle caster; and (3) spacing leaf spring 16 from steering axle 12 to establish the correct unloaded ride height of the vehicle. Each subsidiary function is met by inclusion of a component within the subassembly 10. Caster angle is set by a caster wedge 20 for positioning directly on top of an axle pad 14. A shock absorber mount 26 extends from a support plate 22 positioned between the caster wedge 20 and a spacing element 28. Spacing is provided by a spacing element 28 which mates with a lower alignment plate 34 on the bottom surface of leaf spring 16.

As assembled, caster wedge 20, support plate 22 and spacing element 28 are stacked in alignment with one another between axle pad 14 and lower alignment plate 34. Alignment pins 35 and 18, extending from alignment plate 34 and axle pad 14, respectively, align wedge 20 and spacing element 28 on the alignment plate and the axle pad, respectively. Pin 18 rests in a alignment hole 42 in pad 14. A U-bolt seat 30 rides on a upper alignment plate 32 formed on the upper surface of leaf spring 16. U-bolt seat 30 is aligned on an alignment pin 33 and includes two U-bolt receiving grooves 31 on its upper surface. A pair of U-bolts 36 can rest in grooves 31, straddling the leaf spring 16 with each leg extending through one of receiving bores 40 through axle pad 14. The caster wedge 20, support plate 22 and spacing element 28 are rotationally aligned by the legs of U-bolts 36 passing adjacent to and abutting the outside edges of the subassembly elements. Four nuts 38 are provided to secure the legs of U-bolts 36 against the bottom surface of pad 14.

Figure 2B:
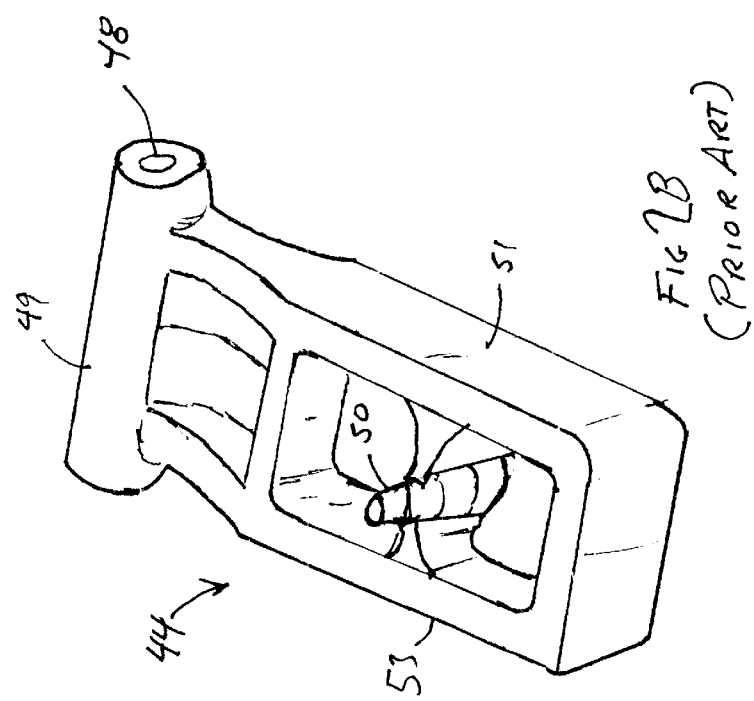
FIGS. 2A and 2B are perspective views of a prior art integrated spacing element, caster wedge and shock absorber mount.
Figure 2A:
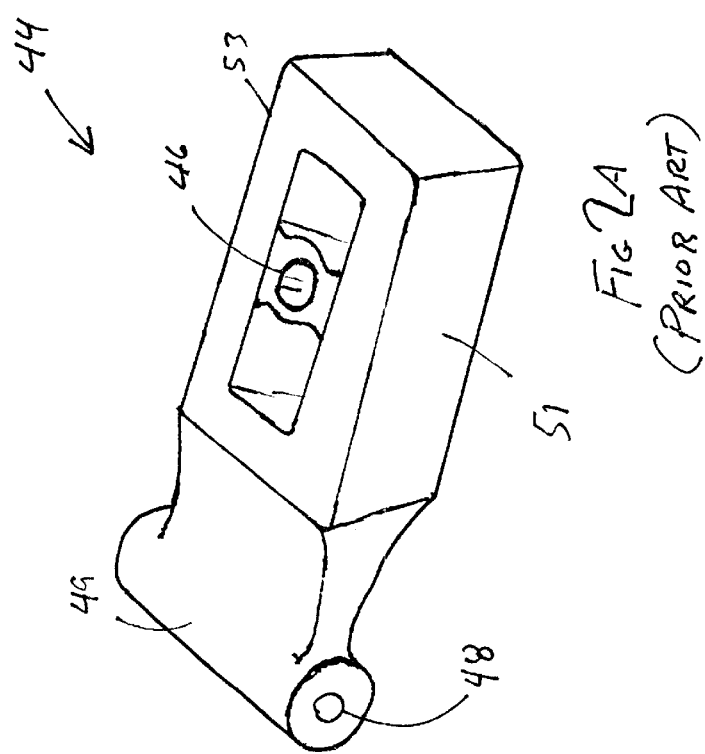

FIGS. 2A and B illustrate a prior art spacing element 44 used in some applications as a substitute for a separate caster wedge 20, support plate 22 and spacing element 28. Essential features of element 44 are an alignment pin receiving hole 46 on the upper face of the element, an alignment pin 50 projecting from the lower face, and a shock absorber mount 49 extending from one end of the element. An operative hole 48, through which a bolt for mounting shock absorber 24 on, passes through the mount 49. The top and bottom surfaces of spacing element 44 may be canted with respect to one another to set steering axle caster. Element 44, as with the plurality of elements discussed with reference to FIG. 1, is rotationally aligned by U-bolt legs abutting the major outer sides 51 and 53. Because the major outer sides 51 and 53 are flat, the width of spacing element 44 must match the spacing between the legs of the U-bolts with which it is to be used. U-bolts 36 are, in turn, sized for a particular width of leaf spring and, as a result, spacing elements constructed in accordance with the design of element 44 must be sized for each width of leaf spring with which they are to be used. The hole 48 through mount 49 has a length equal to the width of the element 44, necessitating the use bolts long enough to extend through the hole and allow the mounting of shock absorber 24. This issue complicates casting of the piece.

FIGS. 3A–C illustrate an integrated, one piece front lower shock mount, axle spacer and caster wedge unit 52 in accordance with a preferred embodiment of the invention. Among the advantages of integrated unit 52 over the prior art is that one size of unit can be used with U-bolts of different widths and retain ease of achieving rotational alignment during vehicle assembly. Integrated unit 52 has an indentation 54 in its upper surface 65 for receiving an alignment pin 35 extending downwardly from a leaf spring 16. The bottom major surface 63 includes an alignment pin 72 which extends downwardly for insertion into receiving hole 42 on axle pad 14.

Integrated unit 52 has outer, profiled edges or sides 56 and 58 on the sides of the unit intended to be placed in contact with the bolt legs. Profiled sides 56 and 58 terminate at each end in projecting ears 60A–D. Projecting ears 60A–B border profiled side 56 and projecting ears 60C–D border profiled side 58. Each profiled edge, substantially adjacent a projecting ear, has a notch for receiving a leg of a U-bolt. Notch 64 is adjacent ear 60A on profiled side 56. Notch 62 is adjacent ear 60B on profiled side 56. Notch 66 is adjacent ear 60C on profiled side 58. Notch 68 is adjacent ear 60D on profiled side 58. Extending from ear 60A is a shock absorber mount 74, which defines a hole 70 for receiving a bolt. Lower and upper major surfaces 63 and 65 are canted with respect to one another to set steering axle caster.

FIG. 4 is an exploded view of a suspension mounting subassembly 10B incorporating an integrated unit 52. Integrated unit 52 is oriented to bring its upper surface 65 into contact with lower alignment plate 34 which faces it from a lower surface of leaf spring 16. Lower surface 63 (shown in FIGS. 3A–C) is oriented to come into contact with axle pad 14 and aligned to introduce alignment pin 72 to alignment hole 42. Profiled sides 56 and 58 are oriented parallel to the direction of elongation of leaf spring 16. A bolt 76 is provided to be introduced through mount 74 to support shock absorber 24. Assembly requires that the U-bolts 36 be positioned straddling leaf spring 16, inverted with the bottom of the U-shaped portion of the bolts resting in grooves 31. The legs of U-bolts 36 abut the surface of profiled sides 56 and 58 to rotationally align integrated unit 52 as they are fitted through holes 40 in axle pad 14.

Figure 5:
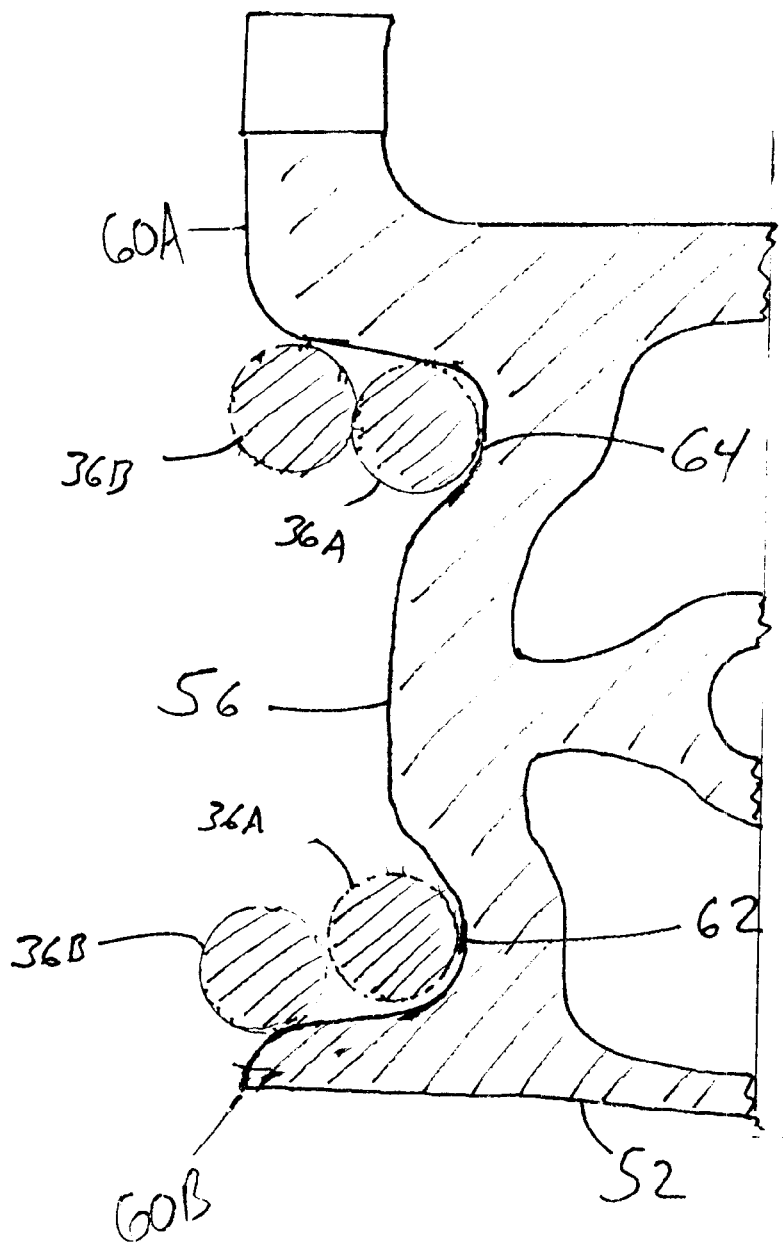
FIG. 5 is a partial cross-sectional view of the integrated front lower shock mount, axle spacer and caster wedge cooperating with two U-bolts.

FIG. 5 is a cross-sectional view illustrating the positional fit between integrated unit 52 and two sizes of U-bolts 36A and 36B along one profiled edge 56. Profiled edge 56 is symmetric with profiled edge 58, and accordingly, the fit of the U-bolts to the profiled edges is also symmetric from side to side. U-bolts 36A and 36B are sized to straddle leaf springs of two different widths, here 3" and 4" respectively. The legs of U-bolt 36A, which are sized to straddle a 3" width leaf spring fit deep in the recesses of notches 62 and 64. The legs of U-bolt 36B fit against the sloped side walls of notches 62 and 64 formed by ears 60B and 60A, outward from the point of contact for the legs of U-bolt 36A.

FIG. 6 is a perspective view of a suspension subassembly 10C providing attachment of steering axle 14 to a 3" leaf spring 86. The deep positioning of the legs for U-bolts 36A in notches 62 and 64 may be readily seen. Integrated unit 52 is oriented squarely on axle pad 14 assuring the caster angle for the steering axle 14 is correctly set. Similarly, FIG. 7 illustrates a subassembly 10D for a leaf spring 96 which is 4" in width. The legs of U-bolts 36B ride much more shallowly in notches 62 and 64 than in subassembly 10B. The direction to the front of the truck on which the subassemblies are used is indicated in both figures by an appropriately labeled arrow.

The integrated caster wedge, front lower shock mount and spacer of the present invention provides replacement for 3 separate pieces in most manufacturing applications. Where prior art integrated units were used, the present invention provides a single size which fits differing widths of leaf springs.

While the invention is shown in only one of its forms, it is not thus limited but is susceptible to various changes and modifications without departing from the spirit and scope of the invention.

What is claimed is:

1. Apparatus comprising:
    a leaf spring;
    a vehicle axle positioned perpendicular to and below the leaf spring to support the leaf spring;
    a plurality of U-bolts positioned with legs straddling the leaf spring;
    a horizontal pad on the surface of the axle, the horizontal pad including a plurality of receptacles for receiving the free ends of the legs of the plurality of U-bolts to trap the leaf spring; and
    a wedge spacer disposed between the horizontal pad and the U-bolts, the wedge spacer having opposed major vertical surfaces profiled to abut legs of U-bolts of various widths to align the wedge spacer.

2. Apparatus as claimed in claim 1, each of the opposed major vertical surfaces of the wedge spacer terminating an outwardly projecting ear.

3. Apparatus as claimed in claim 2, the wedge spacer further having top and bottom major surfaces, the top and bottom major surfaces being slightly angled with respect to one another.

4. Apparatus as claimed in claim 3, wherein the top surface of the wedge spacer mates with a surface of the leaf spring and the bottom surface mates with the horizontal pad.

5. Apparatus as claimed in claim 4, and further comprising a mount for a shock absorber projecting from one outwardly projecting ear.

6. A vehicle suspension subassembly comprising:
   a leaf spring having a downwardly oriented alignment plate;
   a steering axle having a horizontally disposed mounting pad;
   a spacing element disposed between the mounting pad and the alignment plate, the spacing element having top and bottom major surfaces for mating with the alignment plate and the steering axle mounting pad;
   a plurality of U-bolts disposed in a straddling relationship around the leaf spring and spacing element and mated with the steering axle mounting pad; and
   the spacing element further having opposed major vertical sides profiled to cooperate with the U-bolts in various widths to align the spacing element, leaf spring mounting pad and steering axle mounting pad.

7. A vehicle suspension subassembly as set forth in claim 6, and further comprising:
   a centering pin between the spacing element and the alignment plate; and
   a centering pin between the spacing element and the steering axle mounting pad.

8. A vehicle suspension subassembly as set forth in claim 7, wherein the top major surface of the spacing element abuts against the alignment plate and the bottom major surface of the spacing element abuts against the steering axle mounting pad.

9. A vehicle suspension subassembly as set forth in claim 8, wherein each major profiled vertical surface comprises, between first and second outwardly protruding ears, two indentations for receiving the U-bolts.

10. A vehicle suspension subassembly as set forth in claim 9, wherein the top and bottom surfaces are canted with respect to each other to set steering axle caster.

11. An integrated shock absorber mount, spacer and caster wedge for incorporation in a vehicle suspension assembly including a leaf spring and a steering axle, comprising:
    a top major surface shaped to mate with the bottom of the leaf spring;
    a bottom major surface shaped to mate with a pad on the steering axle;
    outside major vertical surfaces, the outside major vertical surfaces including a plurality of paired outwardly projecting ears from each surface, each pair of outwardly projecting ears being shaped to fit snugly at differing points of contact between prongs of U-bolts of at least two distinct widths;
    the top and bottom major surfaces being canted with respect to each other to set steering axle caster; and
    a shock absorber mount projecting from one of the outwardly projecting ears.

12. Apparatus comprising:
    a leaf spring;
    a vehicle axle positioned perpendicular to and below the leaf spring;
    a plurality of U-bolts positioned with legs straddling the leaf spring;
    a horizontal pad on the surface of the axle, the horizontal pad including a plurality of receptacles for receiving the free ends of the legs of the plurality of U-bolts to trap the leaf spring; and
    a wedge spacer disposed between the horizontal pad and the U-bolts, the wedge spacer having opposed major vertical surfaces profiled to abut legs of U-bolts of various sizes to align the wedge spacer, each of the opposed major vertical surfaces of the wedge spacer terminating an outwardly projecting ear.

13. Apparatus as claimed in claim 12, the wedge spacer further having top and bottom major surfaces, the top and bottom major surfaces being slightly angled with respect to one another.

14. Apparatus as claimed in claim 13, wherein the top surface of the wedge spacer mates with a surface of the leaf spring and the bottom surface mates with the horizontal pad.

15. Apparatus as claimed in claim 14, and further comprising amount for a shock absorber projecting from one outwardly projecting ear.

16. A vehicle suspension subassembly comprising:
    a leaf spring having a downwardly oriented alignment plate;
    a steering axle having a horizontally disposed mounting pad;
    a spacing element disposed between the mounting pad and the alignment plate, the spacing element having top and bottom major surfaces for mating with the alignment plate and the steering axle mounting pad;
    a plurality of U-bolts disposed in a straddling relationship around the leaf spring and spacing element and mated with the steering axle mounting pad;
    the spacing element further having opposed major vertical sides profiled to cooperate with the U-bolts in various sizes to align the spacing element, leaf spring mounting pad and steering axle mounting pad;
    a centering pin between the spacing element and the alignment plate;
    a centering pin between the spacing element and the steering axle mounting pad;
    the profiled major vertical surfaces of the spacing element each terminating along vertical edges in first and second outwardly protruding ears, the ears being sloped to fit between U-bolts of different sizes in a snug fit to align rotationally the spacing element between the leaf spring mounting pad and the steering axle mounting pad; and
    a shock absorber mount extending from an ear.

17. A vehicle suspension subassembly as set forth in claim 16, wherein the top major surface of the spacing element abuts against the alignment plate and the bottom major surface of the spacing element abuts against the steering axle mounting pad.

18. A vehicle suspension subassembly as set forth in claim 17, wherein each major profiled vertical surface comprises, between the outwardly protruding ears, two indentations for receiving the U-bolts.

19. A vehicle suspension subassembly as set forth in claim 18, wherein the top and bottom surfaces are canted with respect to each other to set steering axle caster.

* * * * *